United States Patent [19]

Barker, III

[11] Patent Number: 4,866,764
[45] Date of Patent: Sep. 12, 1989

[54] TELEPHONE

[76] Inventor: Charles Barker, III, 990 Grosvenor Pl., Oakland, Calif. 94610

[21] Appl. No.: 236,993

[22] Filed: Aug. 26, 1988

[51] Int. Cl.⁴ ............................................. H04M 1/27
[52] U.S. Cl. ................................... 379/355; 379/368; 379/388; 379/40; 341/23; 341/28; 40/337
[58] Field of Search .................. 379/40, 51, 216, 355, 379/354, 356, 357, 358, 359, 368; 362/88; 341/23, 28; 200/309, 310, 314; 40/337

[56] References Cited

U.S. PATENT DOCUMENTS

| D. 221,951 | 9/1971 | Kindley . | |
|---|---|---|---|
| D. 275,480 | 9/1984 | Thalmair . | |
| D. 277,181 | 1/1985 | Heim et al. . | |
| D. 284,662 | 7/1986 | McKenzie et al. . | |
| 2,853,585 | 9/1958 | Danziger et al. | 200/309 |
| 4,385,212 | 5/1983 | Tyler . | |
| 4,680,790 | 7/1987 | Packard et al. | 379/432 |
| 4,720,849 | 1/1988 | Tayama | 379/90 |

FOREIGN PATENT DOCUMENTS 0050661  5/1981  Japan ................................. 379/355

OTHER PUBLICATIONS

D. O. Johnson, Jr., "Keyboard with Changeable Encoding and Key Designation," IBM TDB, vol. 13, No. 7, 12-1970.

Primary Examiner—James L. Dwyer
Attorney, Agent, or Firm—Jerry T. Kearns

[57] ABSTRACT

A telephone has a first keypad provided with conventionally numbered touch tone keys. A second keypad has a plurality of transparent keys, each provided with a slot for the insertion of a small picture or symbolic representation. Optical fiber may be embedded in each of the transparent keys for illuminating the pictures. The telephone is provided for use with a conventional handset or as a speaker phone. Each of the keys in the second keypad are connected to actuate the speaker phone section of the telephone. The keys of the second keypad are each associated with a memory for the assignment of a telephone number associated with the picture or symbolic representation inserted within the key slot. A large emergency 911 key is also provided. The telephone is designed for use by small children.

5 Claims, 3 Drawing Sheets

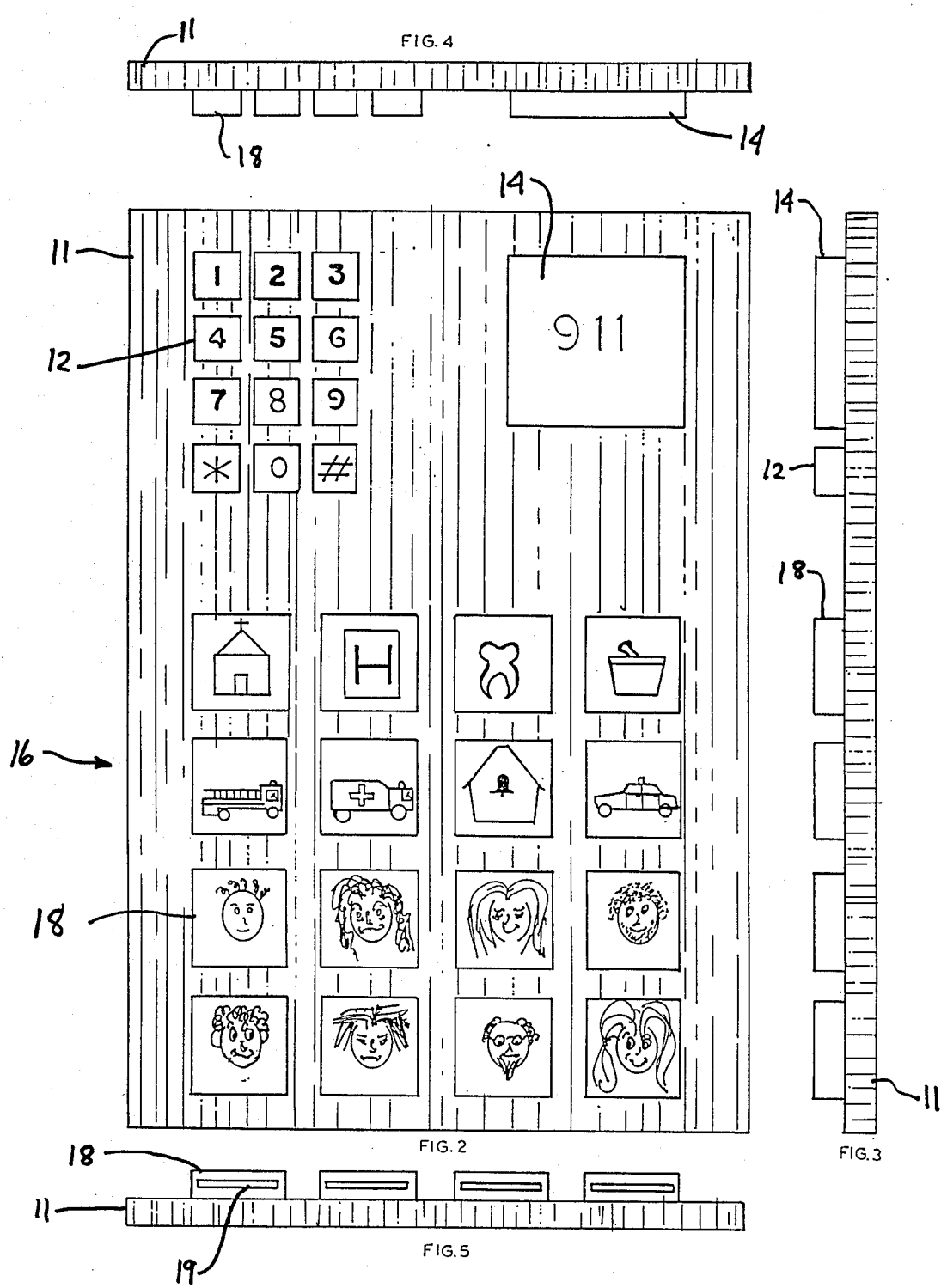

TELEPHONE

BACKGROUND OF THE INVENTION

1. Field of the Invention

The present invention relates to telephones, and more particularly pertains to a new and improved telephone specifically designed to enable emergency use by small children. Small children who have not yet learned the number system are unable to utilize conventional telephones. The present invention provides a dual purpose telephone having a first conventional keypad for use by adults and a second keypad for use by small children. Each of the keys of the second keypad bears a photograph of an individual or a symbolic representation of an emergency service. A telephone number associated with each individual or symbol is stored in a memory associated with the particular key. This enables even very young children to place telephone calls.

2. Description of the Prior Art

Various types of telephones are known in the prior art. A typical example of such a telephone is to be found in U.S. Pat. No. 4,385,212, which issued to D. Tyler on May 24, 1983. This patent discloses an expandable telephone housing which utilizes relatively interconnected dovetail sections. The expansion sections may include additional keypads. U.S. Design Pat. No. 221,951, which issued to J. Kindley on Sept. 21, 1971, discloses a computer keyboard which utilizes keys provided with various symbolic representations. U.S. Design Pat. No. 275,480, which issued to A. Thalmair on Sept. 11, 1984, discloses a keyboard design for a programmable controller. U.S. Design Pat. No. 277,181, which issued to H. Heim et al on Jan. 15, 1985, discloses a teleconferencing telephone control panel provided with a plurality of keypads. U.S. Design Pat. No. 284,662, which issued to R. McKenzie et al on Jul. 15, 1986, discloses a telephone keypad provided with a plurality of keys bearing symbolic representations of various individuals.

While the above mentioned devices are suited for their intended usage, none of these devices disclose a telephone having a first conventionally numbered keypad and a second keypad provided with transparent slotted keys for the insertion of photographs or symbolic representations of various individuals. Additionally, none of the aforesaid devices disclose the use of transparent slotted keys provided with fiber optical illumination for inserted photographs. Inasmuch as the art is relatively crowded with respect to these various types of telephones, it can be appreciated that there is a continuing need for and interest in improvements to such telephones, and in this respect, the present invention addresses this need and interest.

SUMMARY OF THE INVENTION

In view of the foregoing disadvantages inherent in the known types of telephones now present in the prior art, the present invention provides an improved telephone. As such, the general purpose of the present invention, which will be described subsequently in greater detail, is to provide a new and improved telephone which has all the advantages of the prior art telephones and none of the disadvantages.

To attain this, a representative embodiment of the concepts of the present invention is illustrated in the drawings and makes use of a telephone which has a first keypad provided with conventionally numbered touch tone keys. A second keypad has a plurality of transparent keys, each provided with a slot for the insertion of a small photograph or symbolic representation of an emergency service. Optical fiber may be embedded in each of the transparent keys for illuminating the pictures. The telephone is provided for use with a conventional handset or as a speaker phone. Each of the keys in the second keypad are connected to actuate the speaker phone section of the telephone. The keys of the second keypad are each associated with a memory for the assignment of a telephone number associated with the picture or symbolic representation inserted within the key slot. A large emergency 911 key is also provided. The telephone is designed for use by small children.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved telephone which has all the advantages of the prior art telephones and none of the disadvantages.

It is another object of the present invention to provide a new and improved telephone which may be easily and efficiently manufactured and marketed.

It is a further object of the present invention to provide a new and improved telephone which is of a durable and reliable construction.

An even further object of the present invention is to provide a new and improved telephone which is susceptible of a low cost of manufacture with regard to both materials and labor, and which accordingly is then susceptible of low prices of sale to the consuming public, thereby making such telephones economically available to the buying public.

Still yet another object of the present invention is to provide a new and improved telephone which provides in the apparatuses and methods of the prior art some of the advantages thereof, while simultaneously overcoming some of the disadvantages normally associated therewith.

Still another object of the present invention is to provide a new and improved telephone which enables even very young children to place emergency telephone calls.

Yet another object of the present invention is to provide a new and improved telephone which utilizes a first conventional keypad for adult usage and a second keypad provided with symbolic representations for use by small children.

Even still another object of the present invention is to provide a new and improved telephone which utilizes a keypad having a plurality of transparent slotted keys for the insertion of photographs and provided with fiber optic illumination for the inserted photographs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a front view of the keyboard panel of the telephone of the present invention.

FIG. 3 is a side view of the keyboard panel of the telephone of the present invention.

FIG. 4 is a top view of the keyboard panel of the telephone of the present invention.

FIG. 5 is a bottom view of the keyboard panel of the telephone of the present invention.

DESCRIPTION OF THE PREFERRED EMBODIMENT

Figure 1:
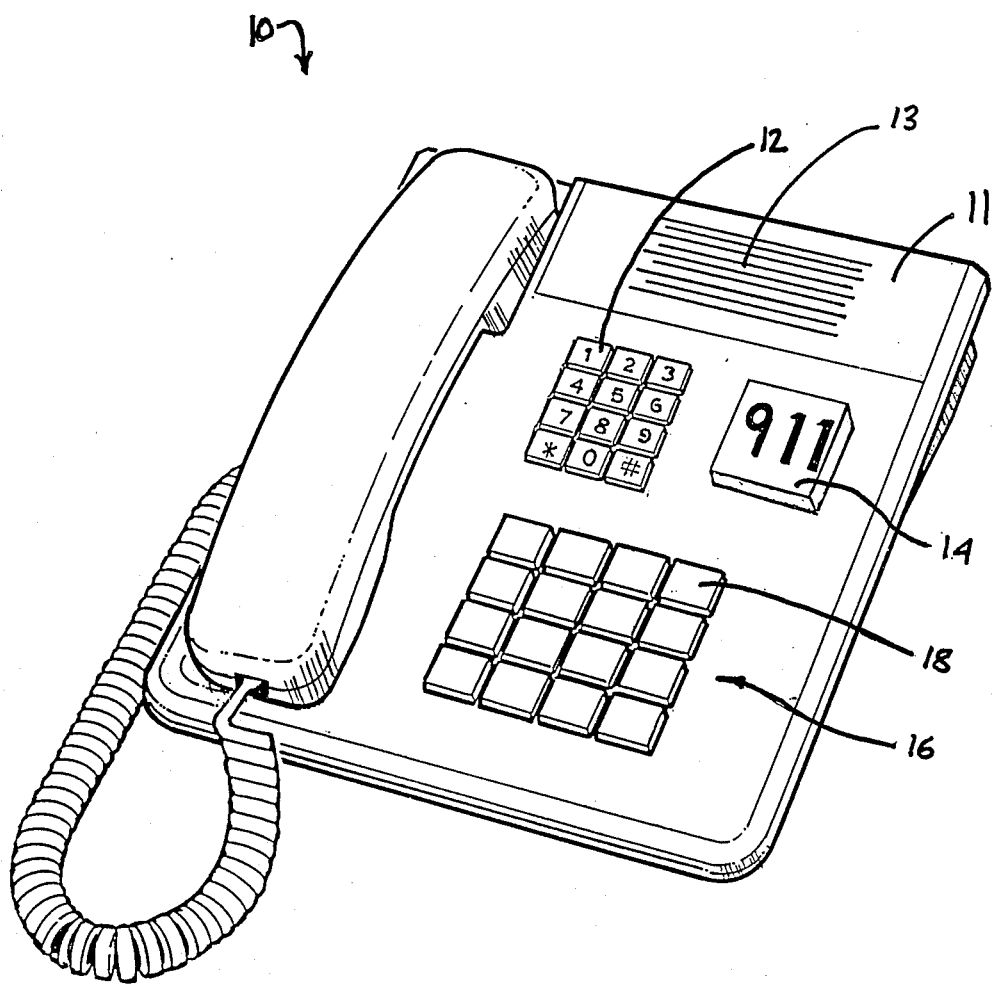
FIG. 1 is a perspective view of the telephone according to the present invention.

With reference now to the drawings, and in particular to FIG. 1 thereof, a new and improved telephone embodying the principles and concepts of the present invention and generally designated by the reference numeral 10 will be described.

More specifically, it will be noted that the first embodiment 10 of the invention includes a telephone 11 having a first conventionally numbered touch tone keypad 12 for use by adults. The telephone 11 is of the type equipped with a speaker phone section 13 which enables operation of the telephone without the use of the handset. An emergency 911 button 14 is provided and is assigned with the memory stored emergency 911 number. A second keypad 16 is formed by a plurality of keys 18, each formed from a transparent plastic material. The keys 18 of the second keypad 16 are each programmable in a conventional fashion and may each be assigned a different telephone number. Additionally, each of the keys 18 is connected to automatically actuate the speaker phone section 13. The electronic components of the telephone 11 are conventional and form no part of the present invention.

FIG. 2 provides a front view of the key panel portion of the telephone 11. As illustrated, each of the keys 18 of the secondary keypad 16 is provided with a symbolic representation of an emergency service, or with a photograph of a particular individual. Each of the keys 18 is provided with an interior slot to allow insertion of the symbolic representation or photograph, in a manner to be further described.

FIG. 3 provides a side view of the key panel portion of the telephone 11 of the present invention.

FIG. 4 provides a top view of the key panel portion of the telephone 11.

FIG. 5 provides a bottom end view of the key panel portion of the telephone 11. As previously described, each of the transparent keys 18 is provided with a slot 19 to allow insertion of a small photograph or of a symbolic representation of an emergency service.

Figure 6:
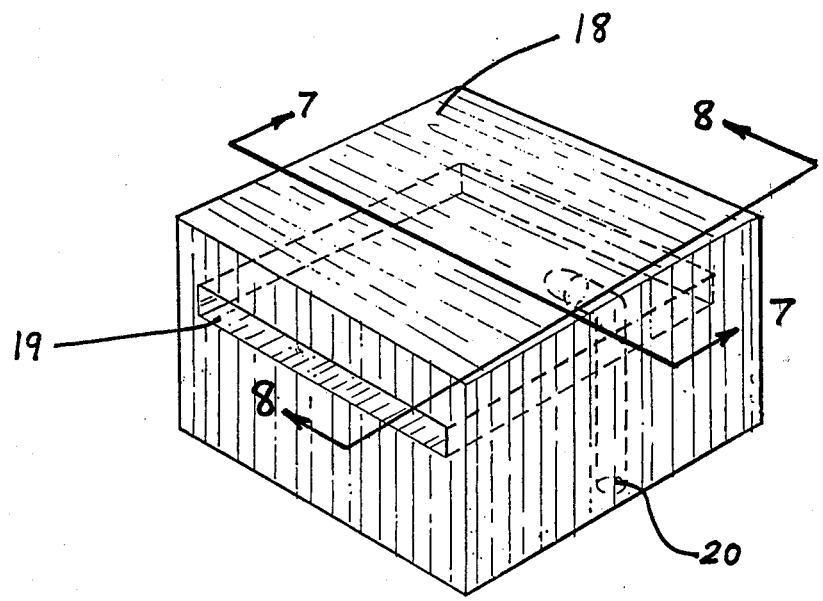
FIG. 6 is a perspective view illustrating the slotted transparent key utilizing the telephone of the present invention.

In FIG. 6, a perspective view is provided which illustrates one of the transparent keys 18 of the secondary keypad 16. Each of the keys 18 has a generally rectangular shape and is provided with an interior open slot 19 which is open on one side to allow insertion of a photograph or of a symbolic representation. The slot 19 forms a hollow rectangular space within the interior of the transparent key 18 which extends in spaced parallel relation to the top rectangular face of the key 18. An optical fiber 20 is embedded within the transparent plastic material of the key 18, and provides illumination of the photograph or symbolic representation inserted within the slot 19. The optical fiber 20 communicates in a conventional fashion with a light source within the interior of the telephone.

Figure 7:
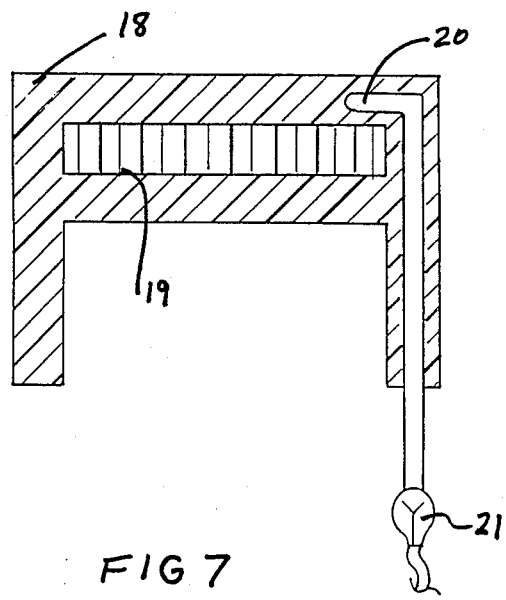
FIG. 7 is a cross sectional view taken along line 7—7 of FIG. 6, further illustrating the construction of the transparent slotted key.

FIG. 7 provides a cross sectional view, taken along line 7—7 of FIG. 6, which further illustrates the construction of the transparent key 18. The optical fiber 20, embedded in a side wall of the key 18, communicates with a light source 21 located within the interior of the telephone. The optic fiber 21 may be arranged to surround the inserted photograph, providing an attractive illuminated picture frame effect.

Figure 8:
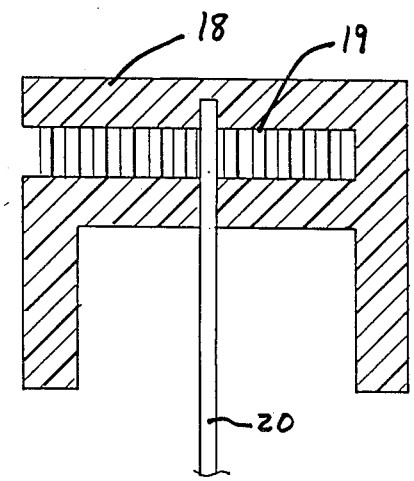
FIG. 8 is a cross sectional view, taken along line 8—8 of FIG. 6, illustrating the construction of the transparent key.

FIG. 8 provides a cross sectional view, taken along 8—8 of FIG. 6, which further illustrates the construction of the key 18.

The telephone of the present invention allows even very young children to place emergency phone calls to emergency service organizations or to particular individuals by enabling the child to dial a number by merely pressing one of the keys 18 bearing the pictorial representation of the appropriate individual or service.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. In a telephone having a first numbered keypad and a speaker phone section, the improvement comprising:
    a second keypad formed by a plurality of programmable keys, each of said keys bearing a pictorial representation of an emergency service or individual;
    each of the keys of said second keypad formed form a transparent material and provided with an open interior slot for the insertion of a photograph or a symbolic representation of an emergency service; and
    an optical fiber within a sidewall of each of said keys and communicating with a light source within said telephone for illuminating each of said transparent keys.

2. The telephone of claim 1, wherein said optical fiber extends above and around a periphery of said interior slot.

3. The telephone of claim 1, wherein each of the keys of said second keypad is connected to simultaneously actuate said speaker phone section and dial a stored telephone number of the associated emergency service or individual.

4. In a telephone having a keypad, the improvement comprising:
    at least one of the keys of said keypad formed from a transparent material and provide with an open interior slot for the insertion of a photograph or a symbolic representation; and
    an optical fiber within a sidewall of said transparent key and communicating with a light source within said telephone for illuminating said transparent key.

5. The telephone of claim 4, wherein said optical fiber extends above and around a periphery of said interior slot.

* * * * *